US005154389A

United States Patent [19]

Hodgin

[11] Patent Number: 5,154,389

[45] Date of Patent: Oct. 13, 1992

[54] DOCUMENT MANIPULATING DEVICE

[76] Inventor: Dennis A. Hodgin, 15 Woodside Pl., Carmel Valley, Calif. 93924

[21] Appl. No.: 757,335

[22] Filed: Sep. 10, 1991

[51] Int. Cl.[5] .............................................. A47B 19/00

[52] U.S. Cl. .................................... 248/441.1; 40/904

[58] Field of Search ................. 40/904, 593, 518, 661; 283/34; 281/45; 434/153, 402, 430; 248/441.1, 447, 444.1, 460

[56] References Cited

U.S. PATENT DOCUMENTS

| | | | |
|---|---|---|---|
| 935,258 | 9/1909 | Immer | 434/402 |
| 2,294,276 | 8/1942 | Callinicos | 40/904 X |
| 3,302,311 | 2/1967 | Israel | 434/402 |
| 3,533,177 | 10/1970 | Tott | 40/904 X |
| 3,553,864 | 1/1971 | Karlyn | 40/904 X |
| 4,157,626 | 6/1979 | Bedinghaus | 40/518 |
| 4,415,106 | 11/1983 | Connell | 40/904 X |
| 4,800,664 | 1/1989 | Marstall | 40/661 |
| 4,862,614 | 9/1989 | Shettleroe | 40/593 X |
| 5,007,192 | 4/1991 | Hochberg | 40/661 |

FOREIGN PATENT DOCUMENTS

| | | | |
|---|---|---|---|
| 3831893 | 3/1990 | Fed. Rep. of Germany | 40/904 |

*Primary Examiner*—J. Franklin Foss

*Attorney, Agent, or Firm*—William H. Eilberg

[57] ABSTRACT

A device for manipulating, supporting and utilizing documents such as maps, charts and blueprints. The preferred device is composed of a plurality of paddles (22) which are connected and freely rotatable about parallel axes to which said document is attached. Other embodiments include a releasable paddle coupler (28) and a clamp (72) with paddle clips (70) to hold flat the attached document and to aid in securing the paddles.

22 Claims, 8 Drawing Sheets

DOCUMENT MANIPULATING DEVICE

BACKGROUND

1. Field of Invention

This invention relates to devices which hold, support, manipulate and utilize all portions of documents such as blueprints, maps and charts and any other document.

2. Description of Prior Art

Documents such as blueprints, maps and charts and other documents, are often used in confined spaces such as airplane cockpits, automobiles, and other locations, and are at times used in adverse environments, such as in the wind, and where there is no space or place to spread such documents out. This device, of the present invention, provides a means of utilizing documents under this and other conditions. It provides a stable surface on which to work, write, place plotters, use scales, and otherwise utilize documents. It also provides an orderly method of using portions of the document by other than the common practice of folding and unfolding.

Numerous devices have been proposed and implemented to handle and manipulate documents such as maps and charts in confined and adverse environments. As early as 1905 there was the Road Map Exhibitor, U.S. Pat. No. 841,800, invented by Metcalfe, which consisted of a clear tube in which the map was inserted into and held tight to the inside face of the tube. Said tube could be rotated to view the map. This had the disadvantage of handling a limited size document, dependent on the length and circumference of the tube. It was limited to a curved surface which would not allow one to properly use devices such as standard plotters or scales. It had the disadvantage that you could not write or mark directly on the document.

Another device developed to manipulate and utilize documents was the Maps and Charts Holder, U.S. Pat. No. 4,157,626, issued to Bedinghaus. It represented an invention for holding a flexible document such as maps and charts. Again, such a device required that the document be rolled tightly in order to utilize various parts of the document. It required exact alignment of the document in the device in order to be able roll the document and have it function properly. The dimension perpendicular to the rolling direction of the document was limited by the fixed dimension of the device. The document was encased and covered by the device, through which one had to utilize it. One would not have been able to mark directly on the document. In order to view the entire document one would have had to remove the document from the device and the document would have been tightly rolled and difficult to layout and manage. The device of this invention was bulky and complicated. The invention consisted of many moving parts making it not economical to build. It would have been costly to purchase a number of the devices of this invention in order to use it for a number of documents as is often required for blueprints and navigation charts. It would also have required a substantial amount of room to store a number of documents mounted to a number of devices of this invention.

The Map Holder, U.S. Pat. No. 4,862,614, issued to Jerry Shettleroe, was representative of another device of limited capability for manipulating maps. It was limited to documents which were manufactured specifically to suit the dimensions and function of the device. The width of the device provided a very limited width of document to be viewed. The document was required to be rolled and wound tightly and would have been subject to tearing, binding and misalignment. It did not provide a stable surface on which one can write or draw on. The device of this invention also required many moving parts and, again, was only useable with custom sized documents. The device would not have lent itself to an economical method of storing or utilizing a number of documents.

SUMMARY OF INVENTION

Accordingly, several objects and advantages of my invention are:

(a) It provides a means of holding and manipulating, and utilizing a document such as a standard map, chart, blueprint and other documents.

(b) It provides a means of manipulating a document to utilize all portions of the document. It allows one to pan from one area of the document to the other, similar to the effect of a computerized moving map display. One is able to view new and preceding areas of the document simultaneously.

(c) The device provides a rigid and light platform on which to work, write, draft, scale and otherwise utilize the document.

(d) The device allows one to open the entire document for viewing without removing it from the device, thereby, allowing one to easily utilize the entire document at one time.

(e) The simplicity of the invention lends it to inexpensive materials which make it a desirable and economic way of holding and storing a number of related documents on a number of the inventions. Such documents could be a set of blueprints for a specific job or a number of aeronautical charts used for a particular flight. A number of the inventions could be stored in holders similar to expanding files or in a container with dividers. This creates a compact storage system for documents. The surfaces of the paddle coupler provide label surfaces. Thus, a number of documents attached to a number of these inventions can be easily stored, managed and accessed.

(f) Unlike previous patents described, this invention does not require custom sized documents to be manufactured in order to be compatible with the size and function of the invention. This invention is adaptable to all standard document sizes.

(g) Unlike previous patents described, this device does not have to tightly roll the document in order to utilize them.

(h) Unlike previous art, this device does not require something to cover the document in order to hold it in place. The document can be accessible to write on, to make notations on, to place markers on and otherwise utilize it.

(i) The device provides a means for allowing one to hold, work on, manipulate, and otherwise utilize a document such as a blueprint, chart, map or other documents in adverse environments such as in wind, while standing, in confined spaces, and all other conditions.

(j) Unlike previous art, the device is not dependent on a number of mechanical mechanisms to make it work. Simple tape is all that is required to attach the document to the invention.

(k) Unlike previous patents, this device requires no tension or restraining device to keep the unused portion of the document in place. The mere folding the document secures the paddles preventing movement. Further objects and advantages of my invention will become apparent from a consideration of the drawings and ensuing description of it.

In summary, this is a device for manipulating a document comprising: a plurality of paddles, means for connecting said plurality of paddles, said plurality of paddles being freely rotatable about parallel axes, whereby one can attach, support, manipulate, and utilize all portions of said document.

DRAWING FIGURES

REFERENCE NUMERALS IN DRAWINGS

Figure 1A:
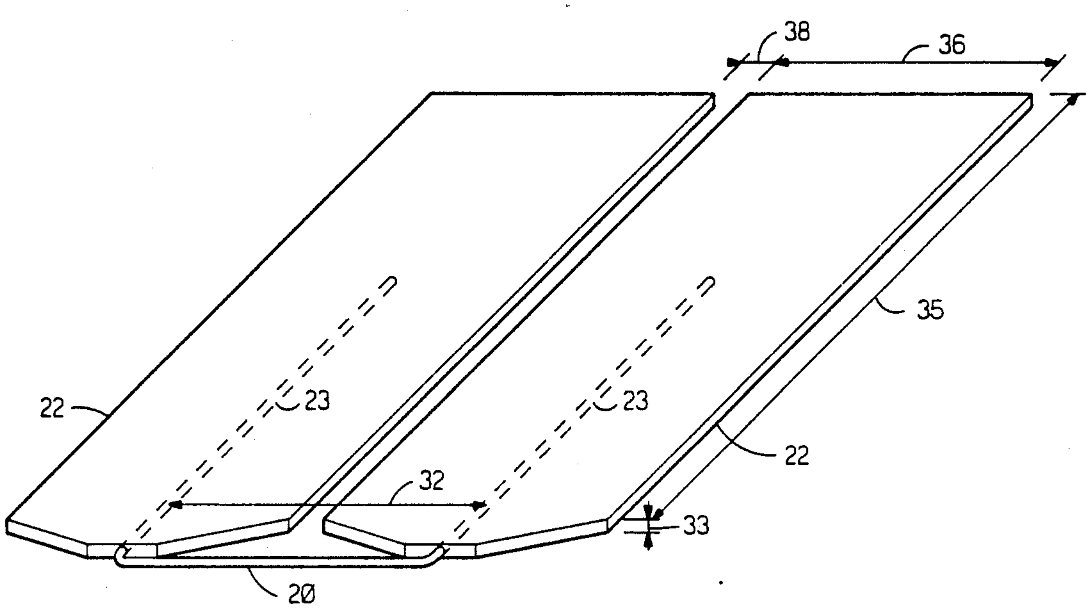
FIG. 1A shows an isometric view of a document manipulating device, according to the invention.
Figure 1:
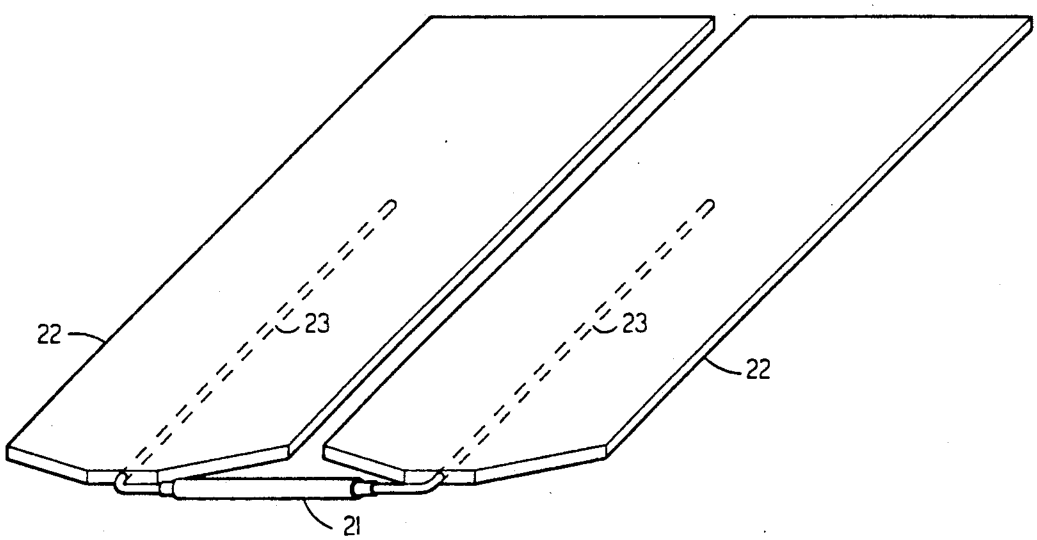
FIG. 1B shows an isometric view of the invention having an adjustable paddle coupler to connect the plurality of paddles, according to the invention.
FIG. 1C shows an isometric view of the invention having a hinging paddle coupler to connect the plurality of paddles, according to the invention.

20: paddle coupler
21: adjustable paddle coupler
22: paddle
23: paddle axle
24: hinging paddle coupler
26: paddle coupler hinge
28: releasable paddle coupler
30: connecting pins
31: document
32: axle center to center dimension
33: thickness dimension of paddle
34: releasable paddle coupler dimension
35: paddle height dimension
36: paddle width dimension
38: distance between paddles
40: paddle—hidden
42: label surface
43: bottom of document
44: document fold
45: document panel
46: panel reference letters
47: end document panels
48: usable area—shaded
53: arrow—action of unfolding document
54: arrow—action of rotation of paddles
56: top useable area
58: opposite side useable area
59: arrow—action of folding of document
60: tape
61: tape hinge
62: carrier
68: connecting pin receiver hole
70: paddle clip
71: formed holes
72: clamp
74: arrow—clip movement
75: document
76: document paddle
78: integral axle
80: arrow—insert location
82: open clip position

DETAILED DESCRIPTION OF THE PREFERRED EMBODIMENT OF THE INVENTION

Figure 3:
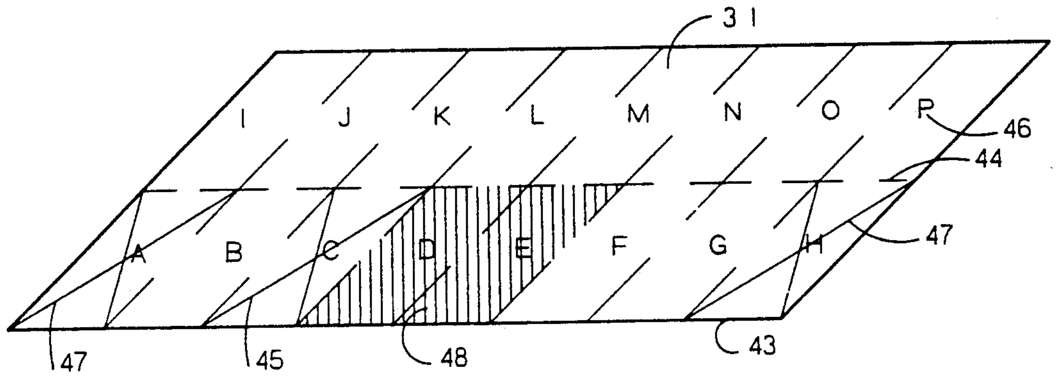
FIG. 3 shows an isometric view of a document with folds and areas called panels within the folds, as would be utilized according to the invention.

FIG. 1A shows a document manipulating device according to the preferred embodiment of the invention. It comprises of two paddles 22 mounted to paddle coupler 20. The paddles 22 are inserted on axles 23. The paddles are spaced and sized to correspond to the document panel sizes of a document which is to be utilized. FIG. 3 illustrates such a document 31 and what is referred to as a document panel 45.

The paddles 22 of the preferred embodiment are composed of rigid, flat panels such as a coated paper laminated on both sides of a sheet of plastic foam. The plastic foam is penetrated to receive the axle of the paddle coupler 20. However, a paddle can be composed of other materials, which provide a surface with the ability to mount the axles of the paddle coupler 20, such as plywood, cardboard, molded plastic, opaque and translucent acrylic plastic sheets, metal sheets, etc.

The paddle coupler 20 of the preferred embodiment is composed of a bent metal rod. The two bent, parallel ends form the axles 23 on which the paddles are mounted. However, the paddle coupler 20 can be composed of any other materials providing axles on which to support the paddles 22, such as a formed plastic rod, a wood bar with metal axles, a molded plastic bar with metal axles, etc.

Dimension 35 is the height of a paddle 22 and dimension 36 the paddle 22 width. Both dimensions 35 and 36 relate to the document panel 45 (FIG. 3) size. The center to center axle dimension 32 is equal to width dimension of the document panel 45. Dimension 33 is the thickness of the paddle. The sum total of one paddle thickness 33 and one paddle width 36 is less than the corresponding width dimension of a document panel 45. The sum total of one paddle thickness 33 and one paddle height 35 is less than the corresponding height dimension of a document panel 45. The space between the paddles dimension 38 is the resulting distance between the freely rotating paddles determined by the paddle width 36 and paddle thickness 33 and the axle center to center dimension 32.

FIG. 1B shows an alternative embodiment of the document manipulating device. It comprises of an adjustable paddle coupler 21. The adjustable paddle coupler is composed of telescoping metal tubes supporting metal rods forming parallel axles 23 on which are mounted paddles 22. Other combinations of materials for the adjustable paddle coupler 21 can be used such as plastics, woods and metals.

Figure 1C:
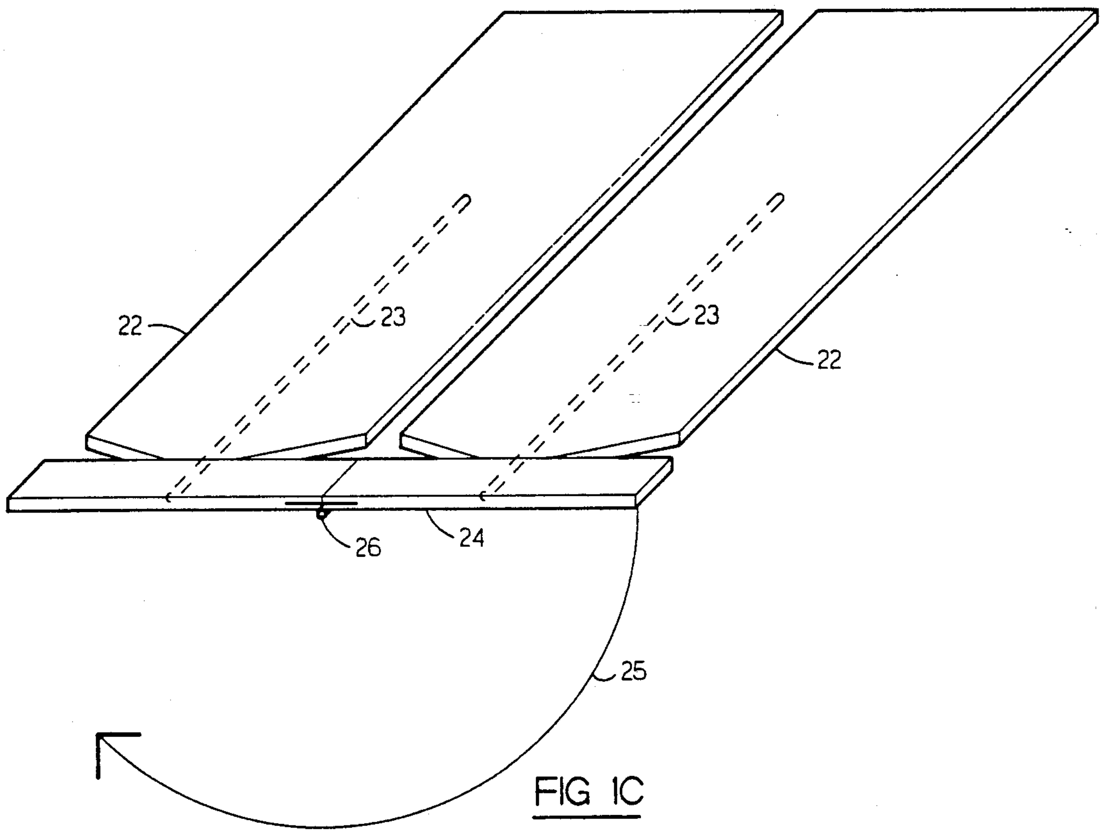

FIG. 1C shows an alternative embodiment of the document manipulating device. It comprises of a hinging paddle coupler 24. The hinging coupler 24 is composed of two pieces of wood connected by a flexible plastic hinge 26. The axles 23 are composed of metal rods secured to coupler 24 pieces. Other materials can be used for the hinging coupler 24 such as molded plastics, extruded metals, extruded plastics, etc. Other materials can be used for the hinge 26 such as metals, molded plastics, etc.

Figure 2:
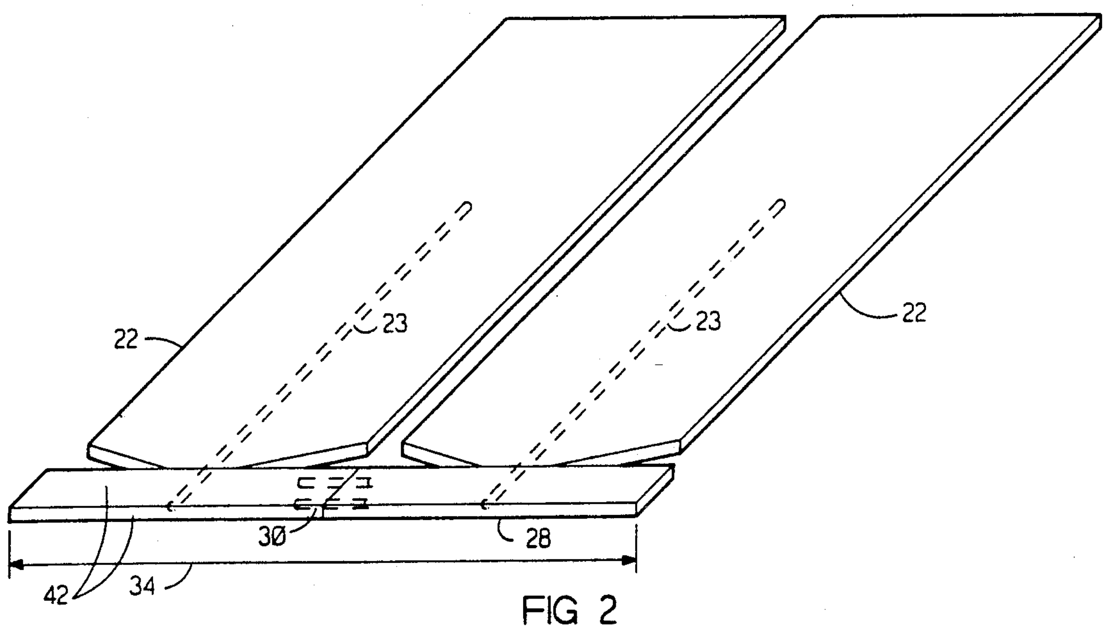
FIG. 2 shows an isometric of the invention having a releasable paddle coupler to connect the plurality of paddles, according to the invention.
Figure 7A:
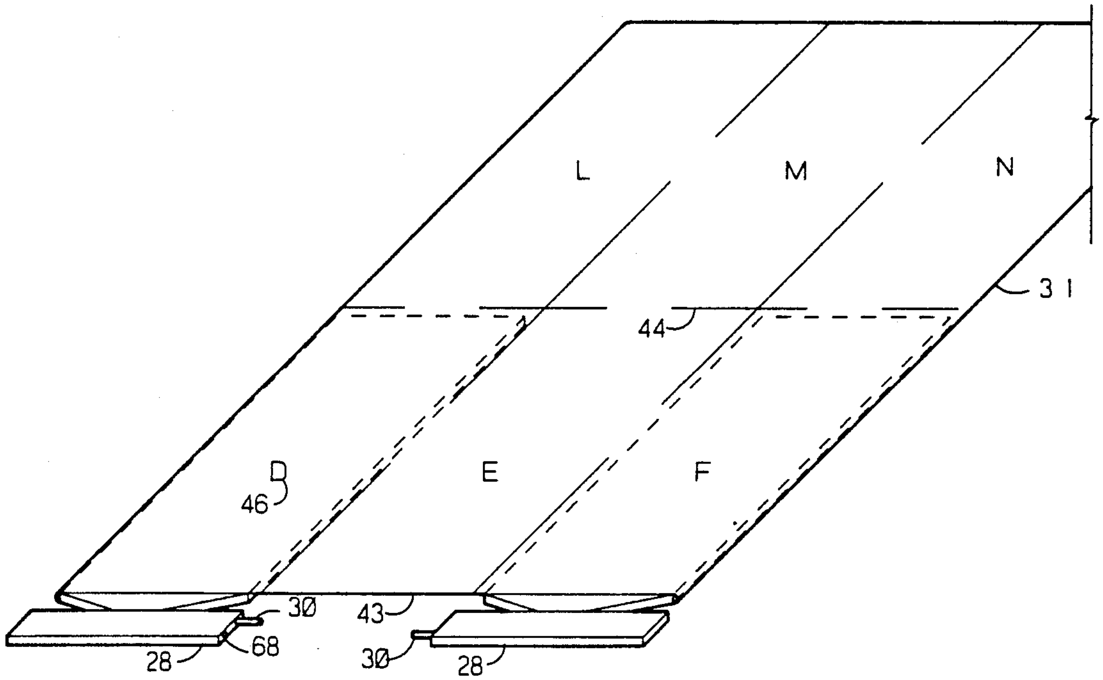
FIG. 7A shows an isometric view of the releasable paddle coupler function, allowing said plurality of paddles to be separated and joined, according to the invention.

FIG. 2 illustrates an alternative embodiment of the document manipulating device comprising of a releasable paddle coupler 28. The paddle coupler 28 is composed of two pieces of wood joined by two wood dowel connecting pins 30. The paddles 22 are mounted to axles 23 which are secured to the coupler 28. Each piece of the coupler 28 has one connecting pin 30 and one receiver hole 68 (FIG. 7A). The axles are the same as shown in FIG. 1C. The materials of the connecting pins and releasable coupler can be composed of other materials such as molded plastics, extruded plastics and extruded metals, etc. The dimension 34 is preferred to be equal to the width of the viewable portion of the document 48 (FIG. 3). The dimension 34 can be any dimension as required to support the paddles 22.

Figure 5A:
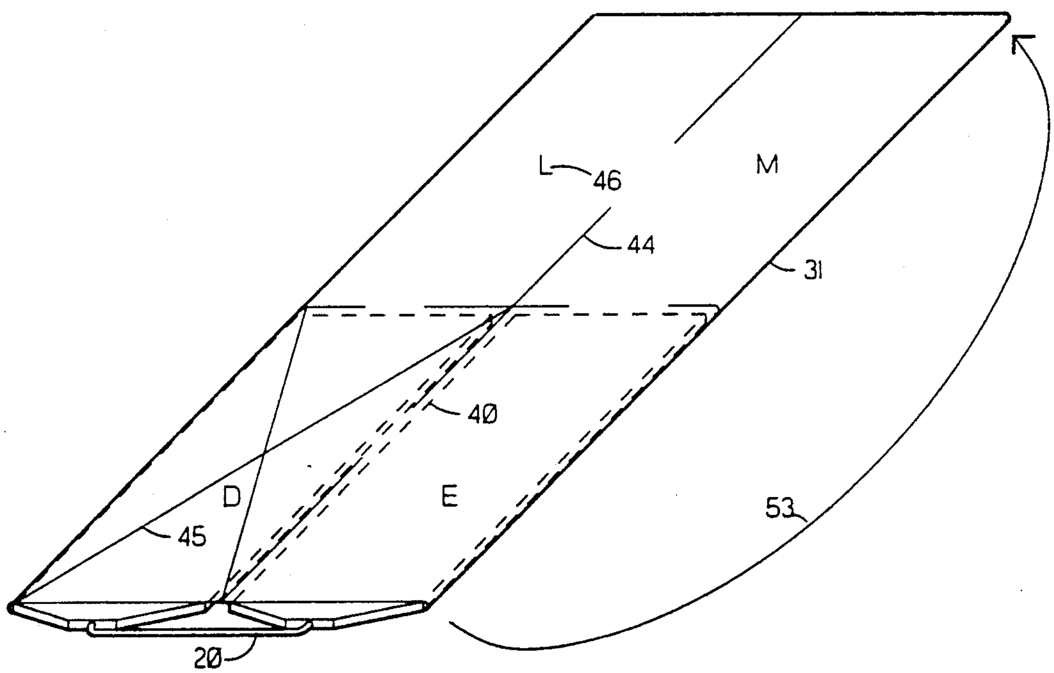
FIG. 5A shows an isometric view of the first action, unfolding the document, as required in order to advance to another area of the document, according to the invention.
Figure 5B:
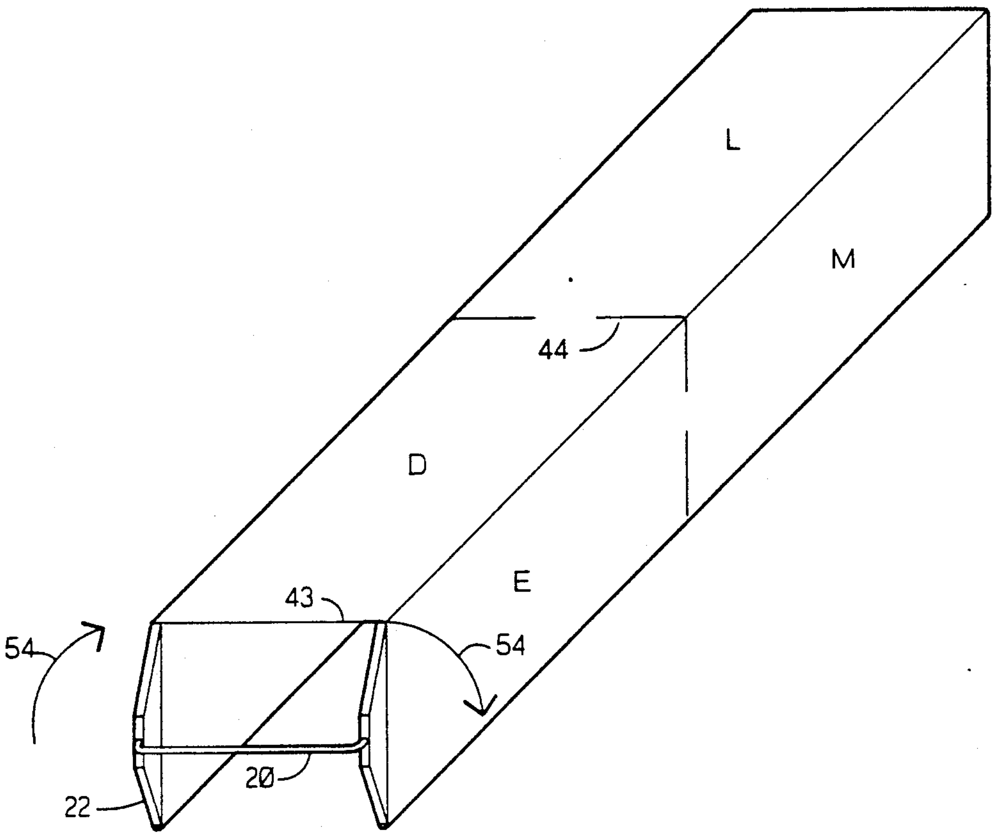
FIG. 5B shows an isometric view of the second action, rotation of the paddles in either direction, required to advance to another area of the document, according to the invention.
Figure 5C:
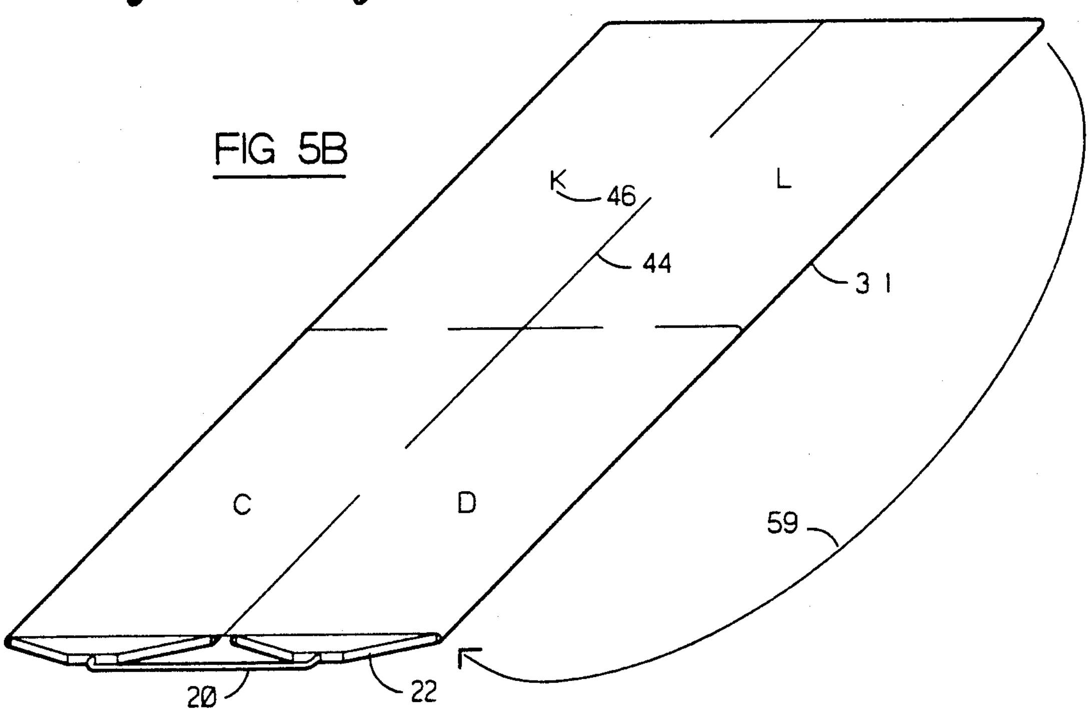
FIG. 5C shows an isometric view of the completion of the second action as shown in FIG. 5B, according to the invention.

FIG. 3 shows an example of a document 43 such as a folded map, chart, etc. which can be utilized and mounted to the document manipulating device. Document fold 44 is a typical fold. Usable area—shaded 48, shows a typical example of the size of a usable area of the document as it would occur when manipulated by the invention. Document panel 45 illustrates a typical panel formed by folds in the document. Panel reference letters 46 are to illustrate various locations of the document 31 as it is manipulated as shown in FIGS. 5A–5C. Document end panels 47 are portions of the document which are attached to the invention.

Figure 4A:
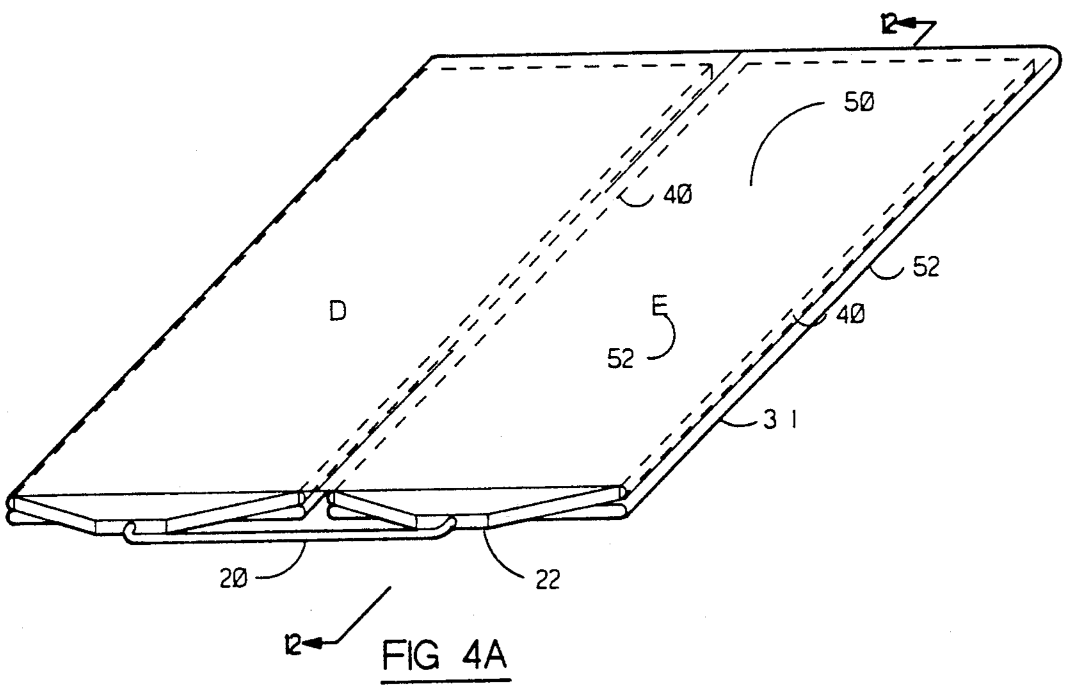
FIG. 4A shows an isometric view of the invention, as shown in FIG. 1A with the document shown in FIG. 3 mounted according to the invention.

FIG. 4A shows the document manipulating device as illustrated in FIG. 1A with the document 31 (FIG. 3) attached and wound around the paddles 22. Visible document panels D and E illustrate a typical usable area—shaded 48 (FIG. 3). Usable document panels L and M are on the opposite side 52. The dashed line shows the paddle—hidden 40 as it is situated with the document mounted to the device. Arrows 12—12 show the cross section as shown in FIG. 4B.

Figure 4B:
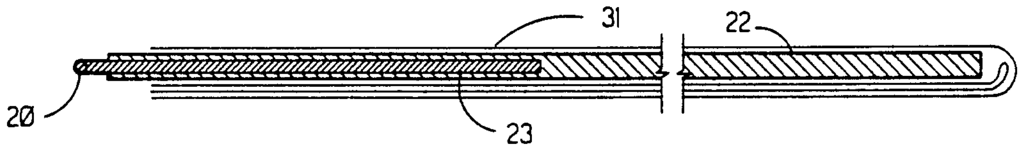
FIG. 4B shows a cross section view through the operating portion of the invention as shown in FIG. 4A and as indicated by section lines 12—12, according to the invention.

FIG. 4B shows a cross section through the document manipulating device with the document mounted as illustrated in FIG. 4A.

FIG. 5A shows the first action in order to move to another area of the document as shown with the document manipulating device as described in FIG. 4A. Arrow 53 shows the unfolding of the document from its preferred position.

FIG. 5B shows the second action in order to move to another area of the document as shown with the document manipulating device as described in FIG. 4A. Arrows 54 show the simultaneous rotation of the paddles 22.

FIG. 5C shows the third action in order to move to another area of the document as shown with the document manipulating device as described in FIG. 4A. Arrow 59 shows the folding direction of the document to its preferred location.

Figure 5D:
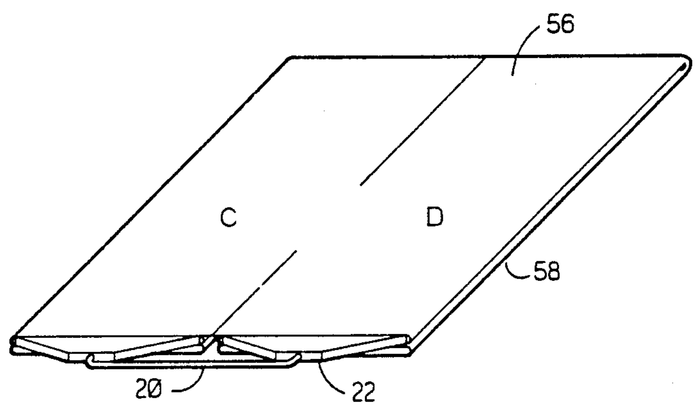
FIG. 5D shows an isometric view of the third and last action, folding of the document, upon completing movement to another area of the document, according to the invention.

FIG. 5D shows the document in its preferred location upon completion of the actions shown in FIGS. 5A, 5B and 5C.

Figure 6:
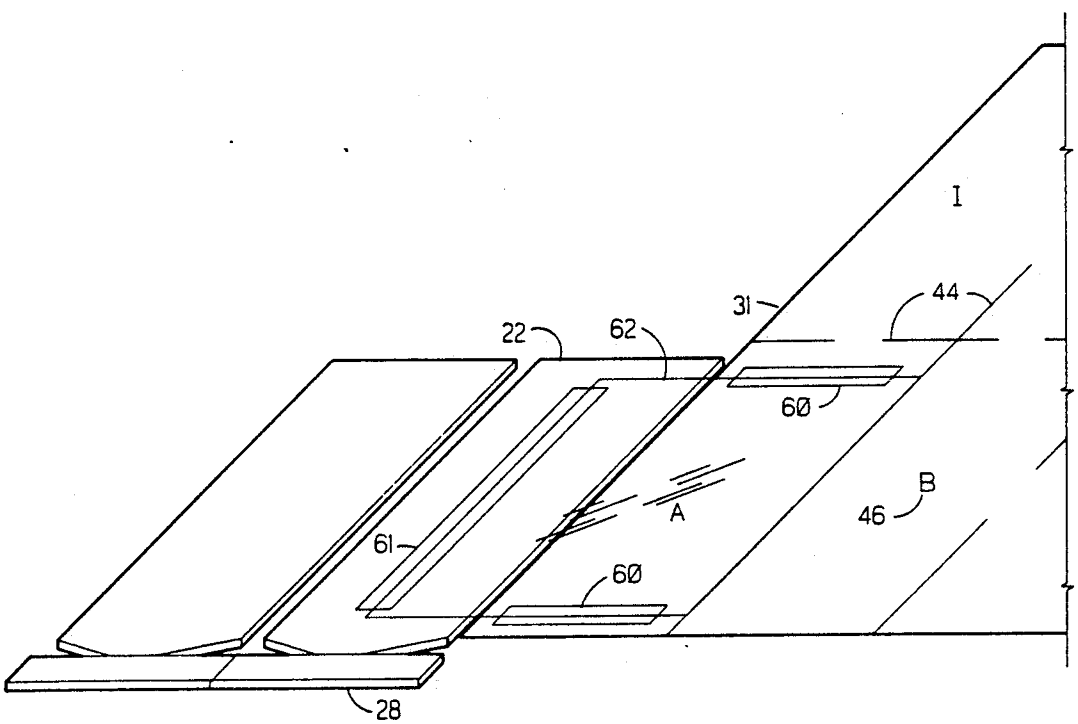
FIG. 6 shows an isometric view of a carrier to secure the document to the paddle, according to the invention.

FIG. 6 shows an alternative embodiment for the document manipulating device. It comprises of a carrier 62 to attach a document to the paddle 22. The carrier 62 is composed of a flexible, translucent plastic sheet. One edge is attached with a tape hinge 61 at the center of the paddle. The hinge 61 is composed of ordinary flexible adhesive tape. The opposing end of the carrier 62 is positioned on the document panel and is attached with translucent tape 60.

FIG. 7A shows the document manipulating device as described in FIG. 4A with the releasable paddle coupler 28 decoupled. It shows the document 31 in a fully open position and mounted to the device. Opposing connecting pins 30 and receiver holes 68 are shown.

Figure 7B:
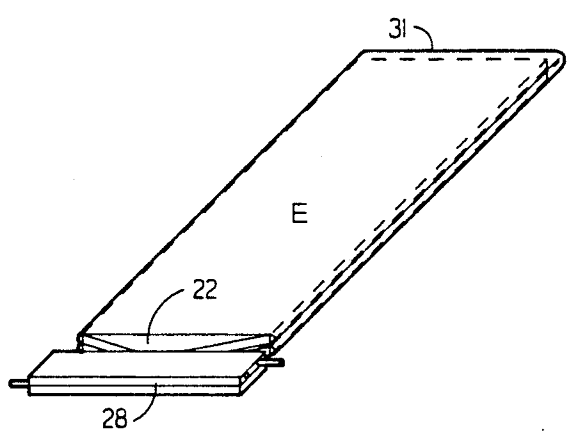
FIG. 7B shows an isometric view of the releasable paddle coupler function, allowing said plurality of paddles to be placed side by side, according to the invention.

FIG. 7B shows the document manipulating device as described in FIG. 4A with the releasable paddle coupler 28 decoupled. It illustrates how one paddle 22 can be placed on top of the other with the document 31 still attached.

Figure 8:
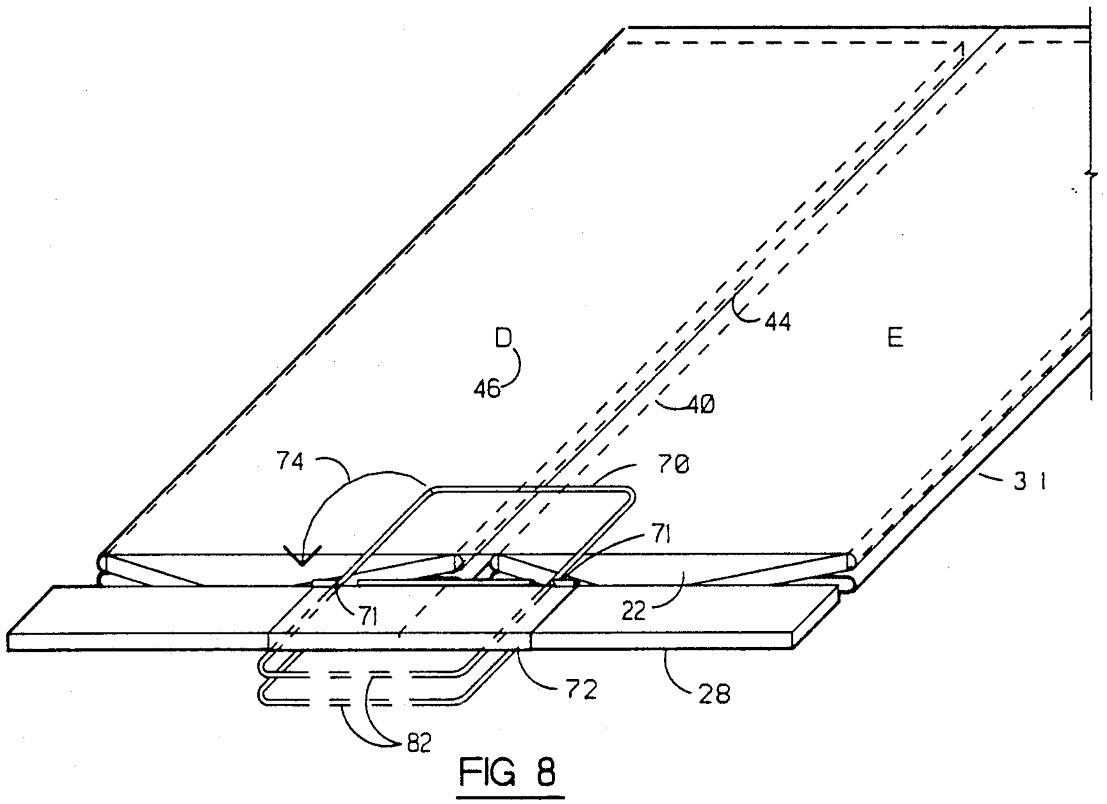
FIG. 8 shows an isometric view of a clamp device as an added way to hold securely portions of the document and as an added way to prevent the plurality of paddles from rotation, according to the invention.

FIG. 8 shows an alternative embodiment to the document manipulating device. It shows a clamp 72 mounted to the document manipulating device as described in FIG. 2. The clamp 72 is composed sprung U shaped metal section which is clamped on to the releasable paddle coupler 28. Attached to the clamp are two rotatable clips 70. The clips 70 are attached by inserting into opposing formed holes 71 made up of bent portions of the clamp 72. The clips are sprung held in the holes 71. The edge distance between opposing holes 71 are closer to each other at a 90 degree position to the coupler 28 than at edge portions adjacent to the coupler 28.

Figure 9:
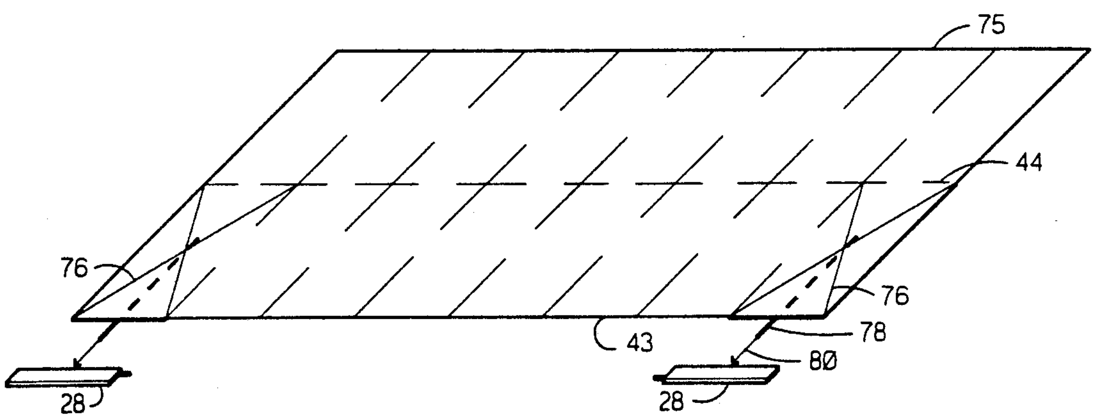
FIG. 9 shows an isometric view of a device with rigid document panels as a plurality of paddles, according to the invention.

FIG. 9 shows an alternative embodiment to the document manipulating device comprising of a document paddle 76 included as a part of the document 75. The document paddle 76 is a document with rigid document panel with an integral axle 78. Axle 78 is inserted, arrow 80, into holes in the coupler 28 and free to rotate. The document paddle 76 is located at the outermost ends of the document 75. The document paddle 76 can be composed of materials such as cardboard, plastics, metal sheets, etc.

.OPERATION

FIGS. 1-9

In operation and use of the preferred embodiment of the document manipulating device of this invention, one first attaches a document 31 (FIG. 3) to paddles 22 as shown in FIG. 1A. FIG. 3 illustrates a typical document 31 such as a chart or map. The lower outermost document panels 47 (FIG. 3) are attached to each of the paddles 22 by adhesive or tape. The document panels 47 are positioned such that center of the paddles 22 align with the corresponding center of the panels 47. The bottom edge of the document 43 is aligned with the bottom corners of the paddles 22. The document 31 is then wound around both paddles 22 in the opposite direction. The upper half of the document (not attached to the paddles) is folded so it lays next to the paddles. One is now able to utilize the top useable area 56 and the opposite side useable area 58 as shown in FIG. 4A. The folding of the document 31 over the paddles 22 prevents the paddles 22 from rotating. The paddles 22 are preferably made of light weight materials which provide a stable surface on which one can support, write on, scale on and otherwise utilize the document.

FIG. 5A shows the first step in moving from one useable area 48 to another while utilizing the preferred embodiment. One begins by a unfolding, action 53, the document 31. The paddle-hidden 40 position is shown relative to the typical document panel 45. FIG. 5B shows how the paddles 22 can be freely and simultaneously rotated as depicted by rotation arrows 54. The rotation 54 is accomplished by grasping a paddle 22 in each hand and turning them simultaneously in the same direction. By such action the result is document panel D, as example, is lifted from the paddle on which it was positioned. FIG. 5C shows a completion of a 180 degree rotation of the paddles 22. Panel D, as example, is now positioned on the adjoining right paddle 22 and panel C has moved panel D's original position. Arrow 59 shows the folding action of placing panels K and L behind C and D. FIG. 5D shows document panels C and D on top side 56 and document K and L on opposite side 58 in their preferred position to be utilized. The paddles 22 can be rotated in either direction and as many times as necessary to access all document FIG. 1B shows an alternative embodiment of the document manipulating device. The adjustable paddle coupler 21 can telescope thus allowing the paddles 22 to be spread apart. This action will allow one to utilize a plurality of document panels at one time. This embodiment will allow one to use documents with different sizes of panels. The amount of telescoping provided can be dependent on the maximum number of panels one would want to be able to access by the invention at one time. The paddles 22 are free to rotate on the axles 23 the same as shown in the preferred embodiment FIG. 1A.

FIG. 1C shows an alternative embodiment of the document manipulating device which comprises of a hinging paddle coupler 24. Two halves of the coupler 24 are connected in the center by a hinge 26. The paddles 22 are mounted on axles secured to the coupler 24. The coupler 24 can be bent in the center allowing the two halves and paddles to be placed next to each other. This can be accomplished with the document mounted to the invention. This allows one to reduce the overall size of the document to one panel size while still mounted to the invention. The purpose for this is to be able to store the device with its associated document in a small area. FIG. 7B shows the invention in a configurations similar to the result of the hinging coupler 24.

FIG. 2 shows an alternative embodiment of the document manipulating device which comprises of a releasable paddle coupler 28. Two halves of the coupler 28 are joined by connecting pins 30. This allows one to separate the paddles 22 and open the document fully while the document is still attached. It also allows one to attach the paddles 22 to each of document ends 47 with the document fully open. This eliminates the step of having to wind the document all the way around one of the paddles to attach it to the other end of the document. The paddles 22 are free to rotate around axles 23. The axles 23 are secured to the coupler 28. The releasable paddle coupler dimension 34, as shown, is equivalent to the width of the document in its preferred position. This provides a handle to hold the document by and also provides label surfaces 42. FIG. 4A shows the preferred embodiment of FIG. 1A with the document 31 mounted. FIG. 4B shows a cross section of through the device as shown in FIG. 4A. This illustrates the paddle 22 penetrated by axle 23. Paddle 22 rotates freely around axle 23. The document 31 is shown as it appears in cross section when it is mounted and folded on the paddles 22.

FIG. 6 shows a further embodiment of the document manipulating device comprising of a carrier 62 to mount the document 31 to the paddle 22. The purpose of this further embodiment is to allow one to utilize both sides of the document without removing the document from the invention. It also allows one to attach a document with less than full size panels on either end as is the case of some standard folded maps and charts. The carrier 62 is attached to the paddle 22 with tape which hinges at the joint between the carrier 62 and the paddle 22. The carrier width is such that it will cover end document panel 47 when placed adjacent to the paddles 22. As shown in FIG. 6 the carrier 62 is then taped to the document 31 with translucent tape 60. The tape 60 and carrier 62 are translucent in order to be able to view that portion of the document over which the carrier 62 is placed. The carrier 62 is mounted to the least preferred side of the document. Each of the end document panels 47 are attached to corresponding paddle 22 in this manner. Thus when one wishes to utilize the opposite side of the corresponding paddle 22 in this manner. Thus when one wishes to utilize the opposite side of the document, one winds the entire document onto one paddle. This allows one to then begin to wind the document back onto the unencumbered paddle by rotating that paddle in the opposite direction. The fact that the carrier is attached to and able to rotate about the center of the paddle, allows the document to be wrapped around the paddles in either direction.

FIG. 7A shows the releasable paddle coupler 28 decoupled and with the document attached. The connecting pins 30 fit snugly into the opposing connecting pin receiver holes 68. FIG. 7B shows how both paddles 22 can be placed next to each other as provided by the alternative embodiment of FIG. 2.

FIG. 8 shows a further embodiment of the invention which comprises of a clamp 72 to secure the folded portion of the document in place next to the paddles 22 and to aid in preventing the paddles 22 from rotating. The clamp 72 is composed of a U shaped metal body on which two sprung metal clips 70 are attached. In FIG.

8 only one of the two clips 70 are visible. The clamp is symmetrical with a clip on each side. The clips rotate in formed holes 71 made by the clamp 72 body. The edges of the opposing holes are constructed to be closer to each other at the perpendicular position to the clamp 72 body than at the parallel position of the formed hole 71 edge. Thus, the clip 71 is held in a parallel position due to the sprung energy of the clip which seeks the greatest edge distance of the formed holes 71. Although the folding of the document 52 over the paddles prevents the paddles from rotating, the clip 70 placed over the paddles 22 and document 31 hold the paddles absolutely secure. This is helpful when you hold the invention by one hand and write on the document with the other hand. By rotating the clip off of the document, arrow 74, one is then able to manipulate the document as described in FIGS. 5A–5C. Also the clips 70 serve an additional purpose. When clips 70 are in open clip position 82, they can be pressed together. This action releases clamp 72 by spreading the formed hole ends to be able to remove it from the coupler 28. With clamp 72 removed, one is able to decouple the coupler 28 for purposes previously discussed.

FIG. 9 shows a further embodiment of the document manipulating device comprising of document paddles 76. This illustration shows how a document 75 can be manufactured with integral document paddles 76 at each end. The paddles 76 would be comprises of a rigid material with integral axles 78 projecting to be inserted, arrow 80, into a coupler 28. The axles 78 would be free to rotate in holes in the coupler. An alternative would be that there would be receivers in the document paddles 76 in which axles attached to the coupler 28 would be inserted. This has the advantage of making a two sided document that can be printed on both sides of the paddle 76 and would require no mounting to independent paddles.

SUMMARY, RAMIFICATIONS, AND SCOPE

Thus the reader will see that this invention provides an economical, light weight, simple device for manipulating, utilizing and storage of documents such as blueprints, charts, maps and other documents. The invention is adaptable to universally sized documents and requires no complicated mechanisms to manipulate the document. It provides a platform on which one can write, work, or otherwise utilize documents. It has the distinct advantage of allowing one to utilize various portions of documents in small confined spaces whether it be in an automobile, in the cockpit of an airplane or any other limited space. Among its other advantages are:

It allows one to hold, manipulate, view, work on, and otherwise utilize a document while standing.

A number of these devices can economically be used for storing and handling a number of documents such as a set of blueprints.

While my device provides many specificities, these should not be construed as limitations on the scope of the invention, but rather as an exemplification of one preferred embodiment and two alternative embodiments thereof. Many other variations are possible. For example:

Part of the means for connecting the plurality of paddles could support a light for viewing the attached document in the dark.

Part of the means for connecting the plurality of paddles could contain devices such as clocks, timers, and counters.

Part of the means for connecting the plurality of paddles could provide a means of scaling the attached document such as an attached scale and printed scale.

Part of the means for connecting the plurality of paddles could have information printed on it relating to the use of the attached document.

Part of the means for connecting the plurality of paddles could contain a driving mechanism as a means of rotating the paddles.

The plurality of paddles could be mechanically held in their preferred static position by spring and catch mechanisms as part of the means for connection to the coupler.

Part of the means for connecting the plurality of paddles could be different colors as a means of color coding.

The means for connection could have sleeves for insertion of labels or information.

Thus the scope of the invention should be determined by the appended claims and their legal equivalents, rather than by the examples given.

I claim:

1. A device for manipulating a document, comprising:

a) a pair of paddles, the paddles being of generally similar shape to each other, each paddle including a generally flat surface and an edge portion, the edge portion having a thickness which is sufficiently smaller than any dimension of the flat surface such that the document can be folded around the paddles with a minimal portion of the document disposed along the edge portion, and b) means for connecting the paddles, the connecting means comprising means for holding the paddles in generally spaced-apart parallel relation, and for allowing the paddles to rotate freely about parallel axes while being held together.

2. The device of claim 1, wherein the connecting means includes a coupler having means for adjusting the distance between the paddles.

3. The device of claim 1, wherein the connecting means comprises a generally U-shaped rod, the rod having end portions which are inserted into the paddles, wherein said end portions define rotational axes for the paddles, and wherein said end portions are generally parallel to each other.

4. The device of claim 1, wherein the connecting means comprises a hinging coupler, the hinging coupler including a pair of generally flat members coupled by a hinge, the flat members being connected to rods inserted into the paddles.

5. The device of claim 1, wherein the connecting means comprises a pair of flat members, the flat members being connected to each other by at least one connecting pin, the flat members being connected to rods which are inserted into the paddles.

6. The device of claim 1, further comprising a flexible sheet of material affixed to one of the paddles, the flexible sheet being capable of being attached to the document.

7. The device of claim 1, wherein the connecting means includes a clamp, the clamp comprising means for maintaining both paddles in generally the same plane, and for holding the document against the paddles.

8. The device of claim 1, wherein the paddles are permanently affixed to ends of the document.

9. In combination, a document and a device for manipulating the document, wherein the device comprises:

a) a pair of paddles, the paddles being of generally similar shape to each other, each paddle including a generally flat surface and an edge portion, the edge portion having a thickness which is sufficiently smaller than any dimension of the flat surface such that the document can be folded around the paddles with a minimal portion of the document disposed along the edge portion, and b) means for connecting the paddles, the connecting means comprising means for holding the paddles in generally spaced-apart parallel relation, and for allowing the paddles to rotate freely about parallel axes while being held together, and wherein the document is attached to both of the paddles, and wherein the document is folded around at least one of the paddles.

10. The combination of claim 9, wherein the connecting means includes a coupler having means for adjusting the distance between the paddles.

11. The combination of claim 9, wherein the connecting means comprises a generally U-shaped metal rod, the rod having end portions which are inserted into the paddles, wherein said end portions define rotational axes for the paddles, and wherein said end portions are generally parallel to each other.

12. The combination of claim 9, wherein the connecting means comprises a hinging coupler, the hinging coupler including a pair of generally flat members coupled by a hinge, the flat members being connected to rods inserted into the paddles.

13. The combination of claim 9, wherein the connecting means comprises a pair of flat members, the flat members being connected by at least one connecting pin, the flat members being connected to rods which are inserted into the paddles.

14. The combination of claim 9, further comprising a flexible sheet of material affixed to one of the paddles, the flexible sheet being capable of attachment to the document.

15. The combination of claim 9, wherein the connecting means includes a clamp, the clamp comprising means for maintaining the paddles in generally the same plane, and for holding the document against the paddles.

16. The combination of claim 9, wherein the paddles are permanently affixed to ends of the document.

17. A method of manipulating a document, the document having at least two ends, the method comprising the steps of:

a) attaching the ends of the document to a pair of paddles, the paddles having generally flat surfaces, b) winding the document around the paddles, such that the document becomes folded around the paddles, and wherein only a portion of the document is exposed, and c) rotating the paddles simultaneously, and in the same rotational direction, so that at least part of the portion of the document that is exposed becomes obscured from view and so that another portion of the document becomes exposed.

18. The method of claim 17, wherein the document which is wound around the paddles includes a portion which extends beyond the surfaces of the paddles, and wherein the method further comprises the step of folding said extending portion over the paddles so as to prevent further rotation of the paddles.

19. The method of claim 17, wherein the rotating step is preceded by the step of partially unwinding the document, and wherein the rotating step is followed by the step of re-winding the document around the paddles after a desired portion of the document is exposed.

20. A method of manipulating a document, the document being wound around a pair of paddles having generally flat surfaces, such that the document is folded around the paddles, the document having a portion extending beyond the surfaces of the paddles, said extending portion of the document being folded over the paddles, wherein only a portion of the document is exposed, the method comprising the steps of:

a) unfolding said extending portion of the document, such that the extending portion lies in substantially the same plane as the part of the document that is folded around the paddles, and b) rotating the paddles simultaneously, and in the same direction, so that the portion that is exposed becomes obscured from view and so that another portion of the document is exposed.

21. The method of claim 20, further comprising the step of refolding the extending portion of the document around the paddles.

22. The method of claim 20, wherein the rotating step is preceded by the step of partially unwinding the document which is wound around the paddles, and wherein the rotating step is followed by the step of rewinding the document around the paddles after a desired portion of the document is exposed.

* * * * *